(12) United States Patent
Jensen

(10) Patent No.: US 7,963,566 B2
(45) Date of Patent: Jun. 21, 2011

(54) APPARATUS AND METHOD FOR REPAIRING A CORE SPRAY LINE PIPE WELD JOINT

(75) Inventor: Grant Clark Jensen, Morgan Hill, CA (US)

(73) Assignee: GE-Hitachi Nuclear Energy Americas LLC, Wilmington, NC (US)

(*) Notice: Subject to any disclaimer, the term of this patent is extended or adjusted under 35 U.S.C. 154(b) by 820 days.

(21) Appl. No.: 11/940,446

(22) Filed: Nov. 15, 2007

(65) Prior Publication Data

US 2009/0127414 A1 May 21, 2009

(51) Int. Cl.
*F16L 21/00* (2006.01)

(52) U.S. Cl. ............ 285/15; 248/74.1; 248/62; 285/420

(58) Field of Classification Search .................... 248/49, 248/62, 65, 74.1, 74.4, 544; 285/15, 367 285/373, 412, 419; 138/97
See application file for complete search history.

(56) References Cited

U.S. PATENT DOCUMENTS

| | | | | |
|---|---|---|---|---|
| 526,088 | A * | 9/1894 | Savill | 285/191 |
| 2,321,417 | A * | 6/1943 | Pepersack | 285/191 |
| 5,521,951 | A | 5/1996 | Charnley et al. | |
| 5,530,219 | A | 6/1996 | Offer et al. | |
| 5,602,887 | A | 2/1997 | Jensen | |
| 5,623,525 | A | 4/1997 | Jensen | |
| 5,642,955 | A | 7/1997 | Jensen | |
| 5,646,969 | A | 7/1997 | Jensen | |
| 5,675,619 | A | 10/1997 | Erbes et al. | |
| 5,699,397 | A | 12/1997 | Jensen | |
| 5,794,314 | A * | 8/1998 | Gamper et al. | 24/517 |
| 5,803,676 | A | 9/1998 | Erbes et al. | |
| 5,807,017 | A * | 9/1998 | Noble | 403/385 |
| 5,905,771 | A | 5/1999 | Erbes et al. | |
| 5,947,529 | A | 9/1999 | Jensen | |
| 6,056,332 | A * | 5/2000 | Foster | 285/367 |
| 6,131,962 | A | 10/2000 | Jensen et al. | |
| 6,201,847 | B1 | 3/2001 | Jensen et al. | |
| 6,345,084 | B1 | 2/2002 | Jensen | |
| 6,375,130 | B1 | 4/2002 | Jensen et al. | |
| 6,421,406 | B1 | 7/2002 | Jensen | |
| 6,452,095 | B1 * | 9/2002 | Perrault | 174/40 R |
| 6,456,682 | B1 | 9/2002 | Jensen | |
| 6,595,472 | B1 * | 7/2003 | Pisczak | 248/74.1 |
| 6,857,814 | B2 | 2/2005 | Jensen | |
| 7,203,263 | B2 | 4/2007 | Jensen | |
| 2008/0283686 | A1 * | 11/2008 | Copper | 248/74.1 |

* cited by examiner

*Primary Examiner* — Terrell McKinnon
*Assistant Examiner* — Steven M Marsh
(74) *Attorney, Agent, or Firm* — Nixon & Vanderhye, P.C.

(57) ABSTRACT

A clamping device supports or structurally replaces a weld joint between connected pipes. The clamping device includes an upper clamp body and a lower clamp body securable on opposite sides of the connected pipes in facing relation, and at least one clamp bolt connecting the upper and lower clamp bodies and extendable through the connected pipes. One of the upper and lower clamp bodies has at least one shaped depression, which receives a complementary shaped clamp bolt nut engageable with the clamp bolt. The shaped depression prevents rotation of the clamp bolt nut.

8 Claims, 6 Drawing Sheets

APPARATUS AND METHOD FOR REPAIRING A CORE SPRAY LINE PIPE WELD JOINT

BACKGROUND OF THE INVENTION

The invention relates generally to a weld joint and, more particularly to an apparatus and method for repairing or replacing a core spray line weld joint in a boiling water nuclear reactor.

A core spray piping system in operating boiling water reactors is typically of welded construction. The welds in the core spray system piping, however, are susceptible to intergranular stress corrosion cracking (IGSCC). As a consequence, welded pipe joints in the core spray line can become cracked.

Common to most operating reactors, the core spray cooling water is delivered to the reactor core region by piping internal to the reactor vessel. A portion of this internal piping is a horizontal segment that follows the radius of curvature of the reactor vessel wall. The proximal end of the horizontal piping is connected to a T-box at the core spray nozzle penetration. This weld is designated as the P3 weld. The distal end of the horizontal core spray line is welded to a short radius elbow. This weld joining the distal end of the core spray line to the short radius elbow is designated as the P4a weld. In at least one boiling water reactor design, there is another weld in the core spray line in close proximity to the T-box. This weld is designated as the P3a weld. An exemplary piping configuration near the vessel T-box is shown in FIG. 1.

In the event that cracking should occur in the P3a weld, the structural integrity of the core spray line, which delivers cooling water to the reactor core, would be lost. A preemptive repair would be desirable to prevent separation of the P3a weld in the event that circumferential through-wall cracking should occur at this weld location in the core spray line.

BRIEF DESCRIPTION OF THE INVENTION

In an exemplary embodiment, a clamping device supports or structurally replaces a weld joint between connected pipes. The clamping device includes an upper clamp body and a lower clamp body securable on opposite sides of the connected pipes in facing relation, and at least one clamp bolt connecting the upper and lower clamp bodies and extendable through the connected pipes. One of the upper and lower clamp bodies has at least one shaped depression, which receives a complementary shaped clamp bolt nut engageable with the clamp bolt. The shaped depression prevents rotation of the clamp bolt nut.

In another exemplary embodiment, the clamping device supports or structurally replaces a weld in a core spray line in close proximity to a T-box in a boiling water nuclear reactor. In this context, the clamping device includes an upper clamp body and a lower clamp body securable on opposite sides of the spray line in facing relation. The upper and lower clamp bodies include a trimmed section adjacent the T-box to ensure clearance from the T-box. At least one clamp bolt connects the upper and lower clamp bodies and extends through the spray line. One of the upper and lower clamp bodies has at least one shaped depression, which receives a complementary shaped clamp bolt nut engageable with the clamp bolt. The shaped depression prevents rotation of the clamp bolt nut.

In yet another exemplary embodiment, a method of supporting or structurally replacing a weld joint between connected pipes includes the steps of forming at least one aperture through the connected pipes in a joint area; securing the upper clamp body and the lower clamp body on opposite sides of the connected pipes in facing relation; connecting the upper and lower clamp bodies by a clamp bolt extendable through at least one aperture and securing the clamp bolt with a clamp bolt nut, the clamp bolt nut having a non-circular shape; and preventing rotation of the clamp bolt nut by engaging the clamp bolt nut in a correspondingly shaped depression in one of the upper and lower clamp bodies.

DETAILED DESCRIPTION OF THE INVENTION

A clamping device is described herein that structurally supports or replaces a welded connection between connected pipes and, in particular, replaces the P3a weld that joins a short section of horizontal piping to the remainder of the horizontal piping in the core spray line. The clamping device is applicable to reactor plants with varying sized core spray lines.

Figure 1:
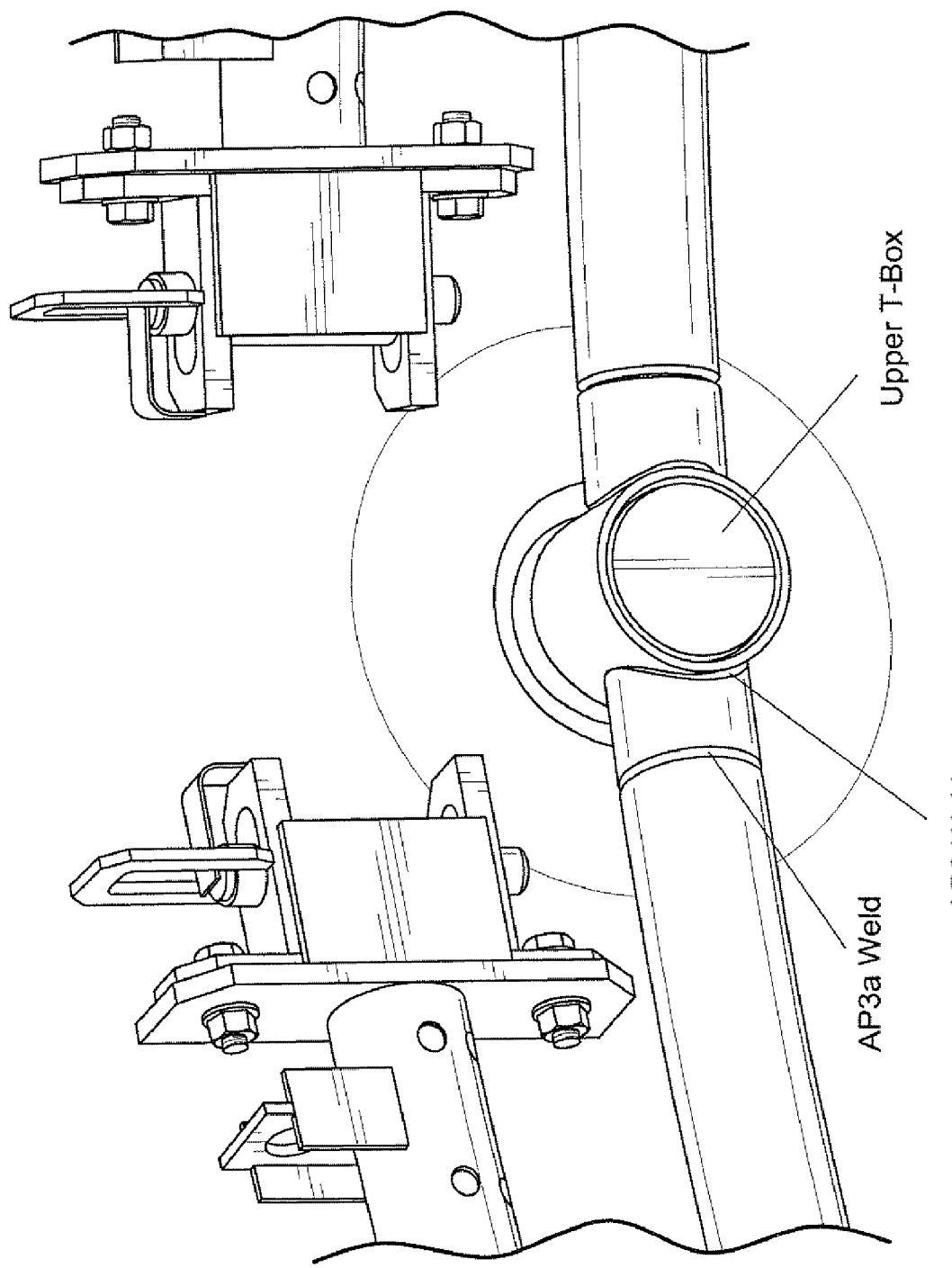
FIG. 1 shows an exemplary piping configuration near the vessel T-box in a boiling water nuclear reactor.
Figure 2:
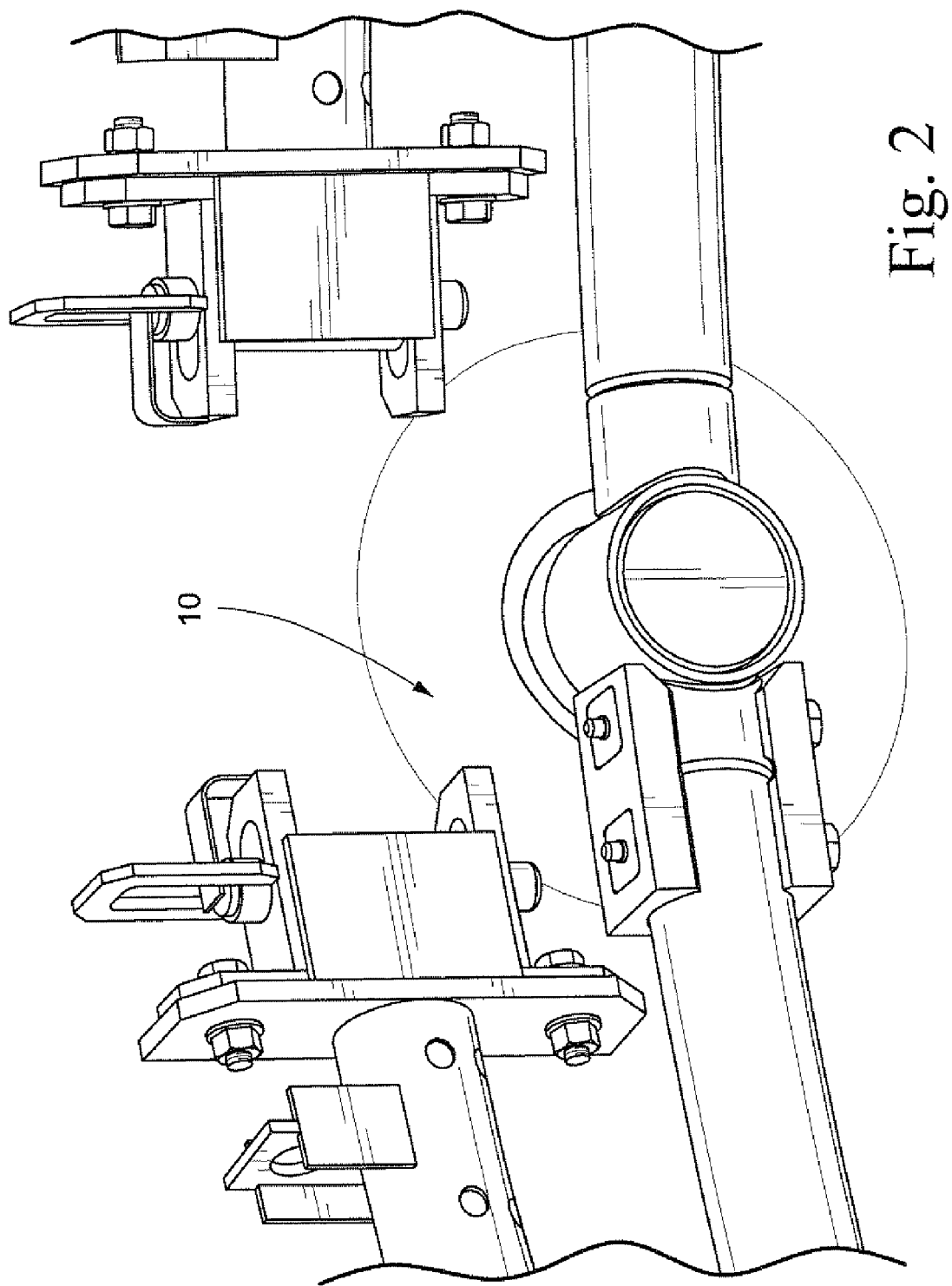
FIG. 2 is a perspective view of the core spray line with a clamping device installed.
Figure 3:
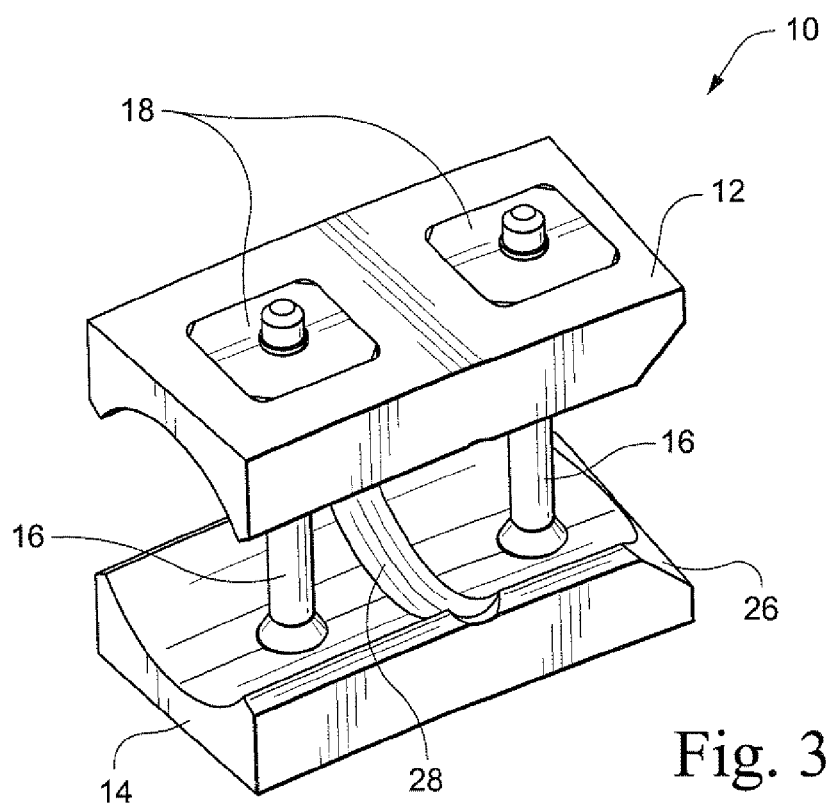
FIGS. 3 and 4 are isometric views of the clamping device.
Figure 4:
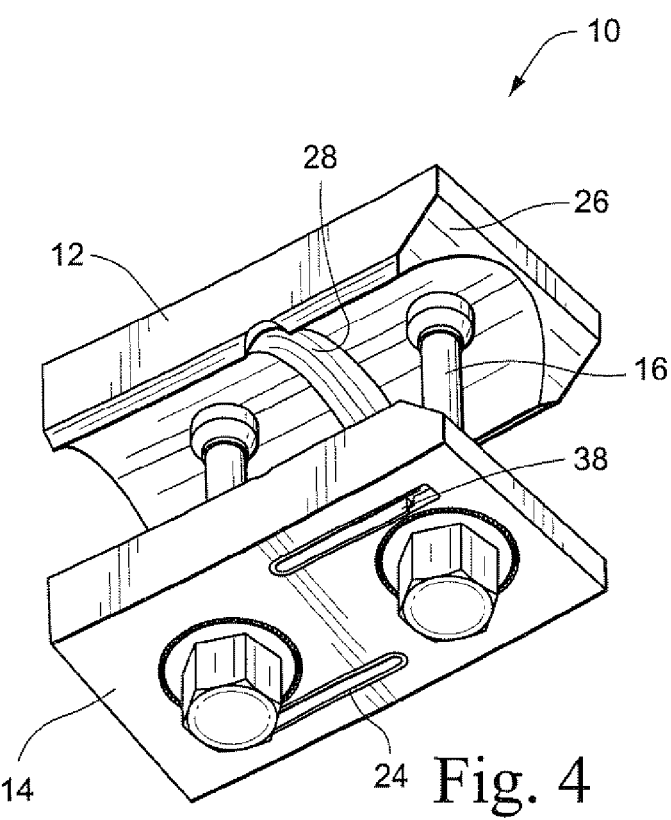

FIG. 2 shows the clamp assembly 10 installed on the core spray line. FIGS. 3 and 4 are isometric views of the clamp assembly 10. The clamp assembly 10 includes an upper clamp body 12 and a lower clamp body 14, which interface with the core spray line. The clamp bodies 12, 14 are held in position on the horizontal pipe by at least one clamp bolt 16, preferably two, which pass through holes formed in the horizontal pipe. A clamp bolt nut 18 is threaded on an end of each clamp bolt 16.

The outside diameter of the core spray line can vary within specified manufacturing tolerances. Also, a curved pipe that has been formed will most likely be slightly oval in cross-section. As such, the radius of curvature machined into the upper and lower clamp bodies 12, 14 is slightly smaller than the nominal radius of curvature of the piping. This ensures that the clamp bodies 12, 14 will interface properly with the core spray line. The upper and lower clamp bodies 12, 14 are preferably machined to interface with a curved pipe (i.e. the machined surface follows or mimics the curvature of the pipe in the plane defined by the curved pipe).

Figure 5:
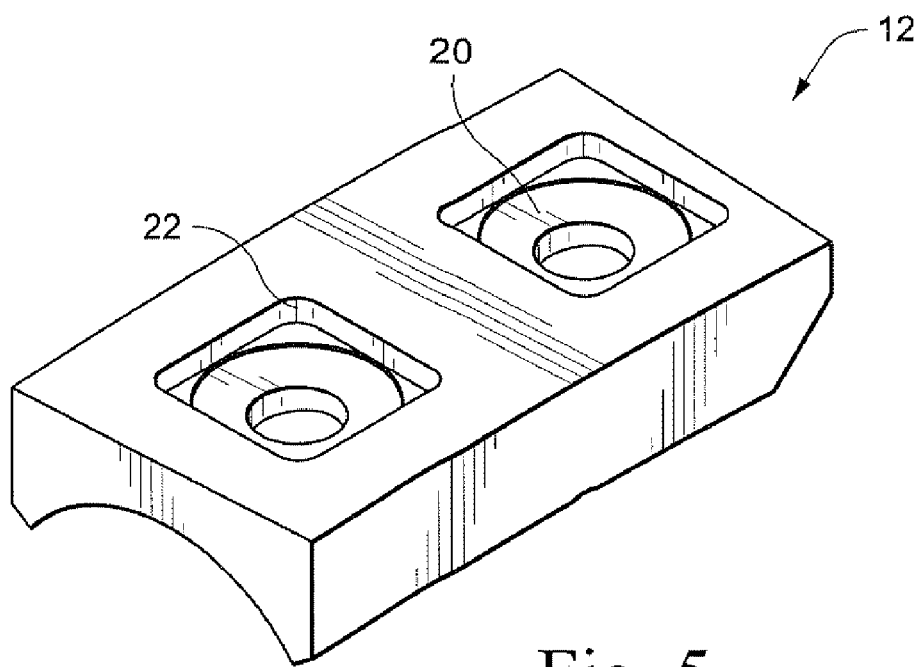
FIG. 5 shows the upper clamp body.
Figure 6:
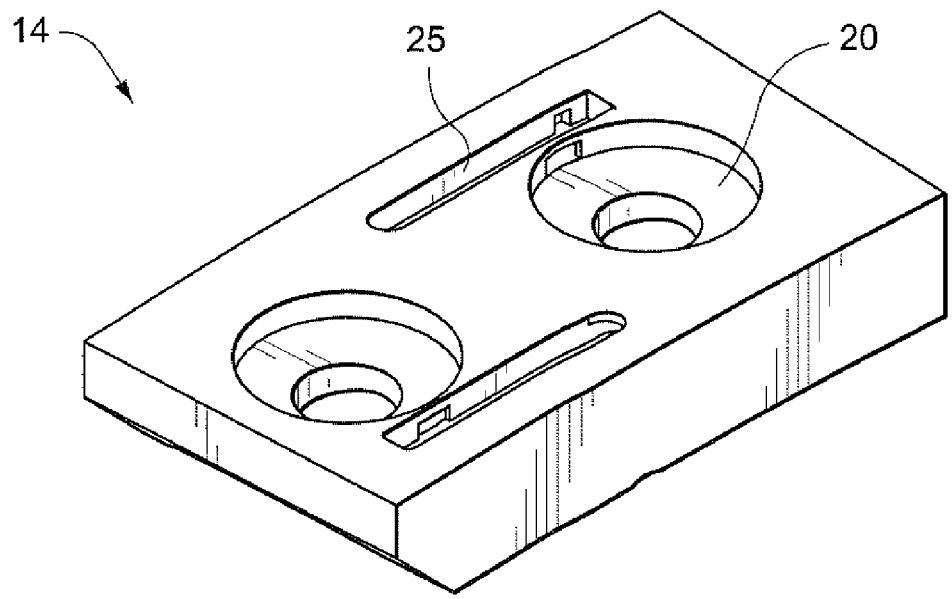
FIG. 6 shows the lower clamp body.

The upper and lower clamp bodies 12, 14 feature spherical seating surfaces 20, which mate with spherical seating surfaces of the clamp bolt nut 18 and the clamp bolt 16, respectively (see FIGS. 5 and 6). In addition, the upper clamp body 12 incorporates a shaped (non-circular, preferably square) machined depression 22, which interfaces with each clamp bolt nut 18 to prevent rotation of the clamp bolt nut 18.

Both the upper and lower clamp bodies 12, 14 include a trimmed section 26 on the side of the respective clamp body 12, 14 to ensure clearance with the core spray T-box and provide future inspection visibility of the P3 weld (see FIGS. 3 and 4). Additionally, both the upper and lower clamp bodies 12, 14 include a machined groove 28 to ensure clearance with any possible P3a weld crown.

The lower clamp body 14 houses a clamp bolt keeper 24 (FIG. 4), which resides in a machined depression 25 in the lower clamp body 14. One clamp bolt keeper 24 is preferably provided for each clamp bolt 16. The clamp bolt keeper 24 is held captive at three separate locations by interfacing features shared by the keeper 24 and the lower clamp body 14. The function of the clamp bolt keeper 24 is to prevent rotation of the clamp bolt 16 and thus retain clamp bolt pre-load (described in more detail below).

The clamp bolt nut 18 internal threads mate with external threads of the clamp bolt 16. The nut 18 has a generally preferably square shape and a spherical seating surface, which interface with the upper clamp body 12. A distal end of the clamp bolt 16 is machined to a diameter slightly smaller than the minor thread diameter of the clamp bolt nut 18 in order to facilitate remote installation of the clamp bolt nut 18. In order to minimize core spray coolant leakage, the outside diameter of the clamp bolt nut 18 is slightly smaller than the machined hole in the core spray line.

Figure 7:
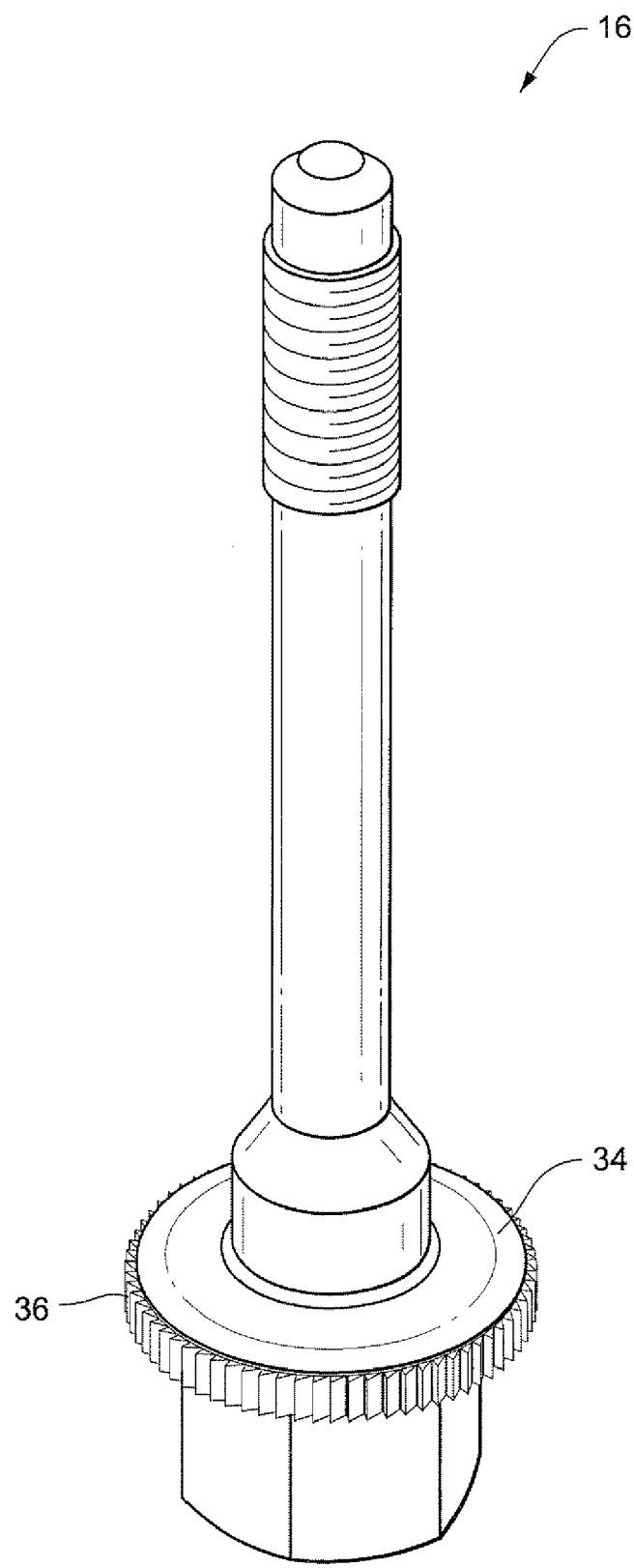
FIG. 7 shows the clamp bolt.

With reference to FIG. 7, a proximal end of the clamp bolt 16 incorporates a spherical seating surface 34 and ratchet teeth 36, which interface with the lower clamp body 14 and teeth 38 of the clamp bolt keeper 24, respectively. In addition, the clamp bolt 16 has a shoulder diameter slightly smaller than the machined hole 46 in the core spray line (see FIG. 8) in order to minimize core spray coolant leakage. The clamp bolt keeper 24 is preferably shaped like a hairpin, which consists of essentially two cantilever beams joined at one end. There are retaining features at the free end of the first and second cantilever beams and also at the common end where both beams are joined together. In addition, the retaining feature at the end of the first cantilever beam also incorporates the teeth 38 that interface with the teeth 36 of the clamp bolt 16 and function to limit rotation of the clamp bolt 16 to the direction that increases bolt pre-load.

Figure 8:
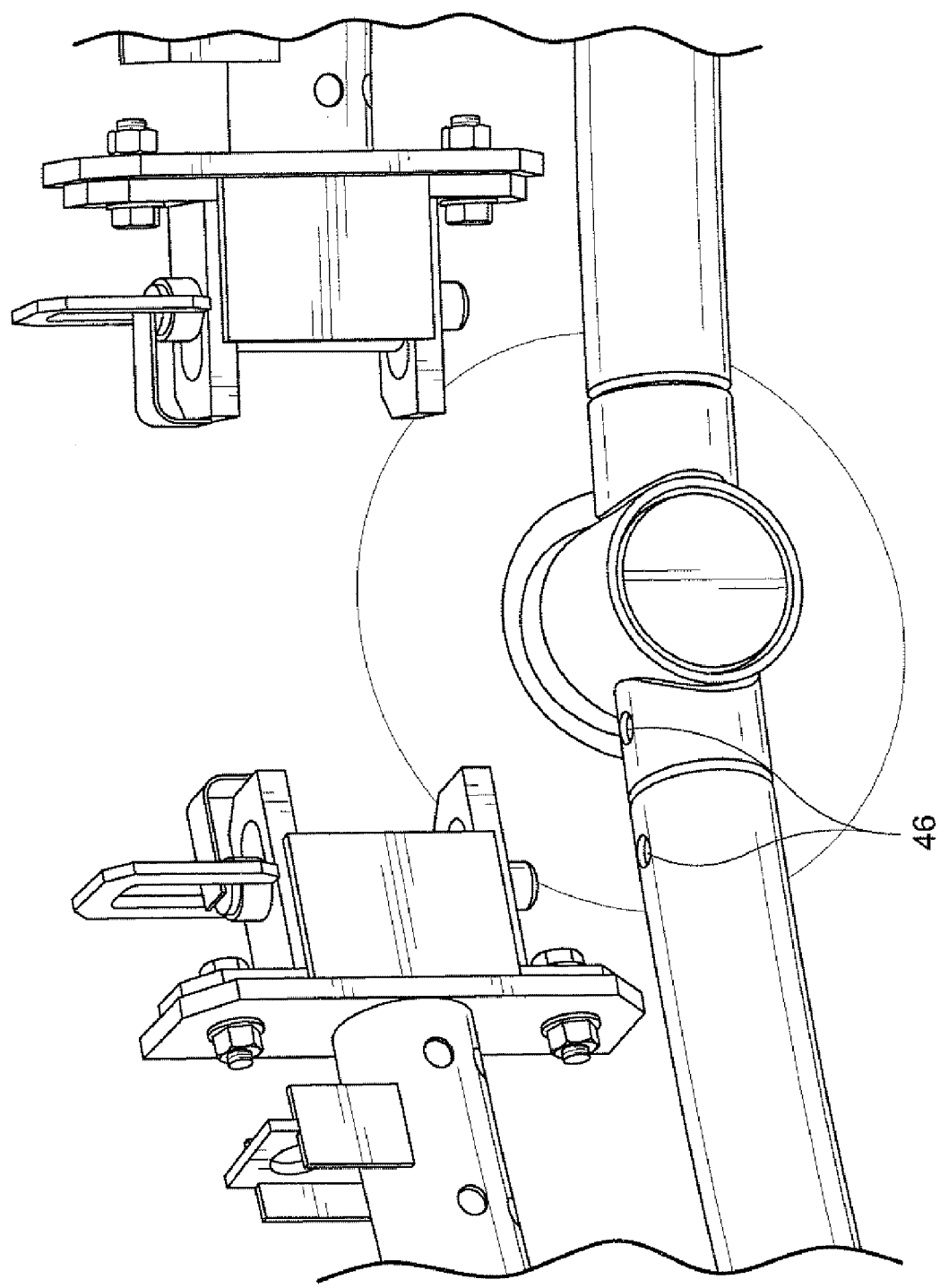
FIG. 8 shows a step in the installation method.

Installation of the clamp assembly 10 is performed by first machining holes 46 via EDM (electric discharge machining) or the like in the piping segment as shown in FIG. 8. Subsequently, the clamp bolt keepers 24, lower clamp body 14, and clamp bolts 16 are brought together as an assembly on the underneath side of the core spray line. Distal ends of the clamp bolts 16 are inserted through the holes 46 provided in the underneath side of the piping and finally emerging from the holes 46 provided on the top side of the piping. The upper clamp body 12 and clamp bolt nuts 18 are then positioned over the distal end of the clamp bolts 16. The clamp bolts 16 are rotated to engage the threads of the clamp bolt nuts 18. The clamp bolts 16 are then tightened to a nominal pre-load. Finally, the clamp bolts 18 are pre-loaded to their final specified values by following an approved torque sequence.

The described clamp assembly supports or structurally replaces the P3a weld between a short section of horizontal piping to the remainder of the horizontal piping in the core spray line. The clamp assembly can be remotely installed and is applicable to reactor plants with varying sized core spray lines.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A clamping device for supporting or structurally replacing a weld joint between connected pipes, the clamping device comprising:
    an upper clamp body and a lower clamp body securable on opposite sides of the connected pipes in facing relation;
    at least one clamp bolt connecting the upper and lower clamp bodies and extendable through the connected pipes,
    wherein one of the upper and lower clamp bodies comprises at least one shaped depression, the shaped depression receiving a complementary shaped clamp bolt nut engageable with the clamp bolt, wherein the shaped depression prevents rotation of the clamp bolt nut, and wherein the other of the upper and lower clamp bodies comprises a machined depression that is shaped to receive a head of the clamp bolt, and a slot depression disposed adjacent the machined depression; and
    a clamp bolt keeper that is received in the slot depression and is engageable with the clamp bolt head to retain a preload on the clamp bolt,
    wherein the clamp bolt keeper comprises a hairpin-shaped member including two cantilever beams joined at one end and interfacing teeth disposed at a free end of one of the two cantilever beams, the interfacing teeth engaging the clamp bolt head to retain the preload on the clamp bolt.

2. A clamping device according to claim 1, wherein the shaped depression in the upper clamp body comprises a spherical seating surface that is shaped corresponding to a spherical seating surface of the clamp bolt nut, and wherein the machined depression in the lower clamp body comprises a spherical seating surface that is shaped corresponding to a spherical seating surface of the clamp bolt head.

3. A clamping device according to claim 1, wherein the clamp bolt head comprises ratchet teeth around a perimeter thereof, the ratchet teeth engaging corresponding teeth on the clamp bolt keeper when the clamp bolt keeper is received in the slot depression.

4. A clamping device according to claim 3, wherein the corresponding teeth and the ratchet teeth are configured to limit rotation of the clamp bolt in a direction that increases the preload on the clamp bolt.

5. A clamping device according to claim 1, comprising two clamp bolts connecting the upper and lower clamp bodies and extendable through the connected pipes.

6. A clamping device according to claim 1, wherein the clamp bolt head comprises ratchet teeth around a perimeter thereof, the ratchet teeth engaging the interfacing teeth on the clamp bolt keeper when the clamp bolt keeper is received in the slot depression.

7. A clamping device for supporting or structurally replacing a weld joint between connected pipes, the clamping device comprising:
    an upper clamp body and a lower clamp body securable on opposite sides of the connected pipes in facing relation, the upper clamp body having a pair of holes therethrough aligned with corresponding holes through the lower clamp body, wherein surfaces of the upper clamp body and the lower clamp body facing the connected pipes are machined to have a radius of curvature;
    a pair of clamp bolts extendable through the pair of holes in the upper clamp body and the corresponding holes in the lower clamp body and engageable with a corresponding pair of clamp bolt nuts to connect the upper and lower clamp bodies together on opposite sides of the connected pipes;
    a first set of depressions respectively machined adjacent the pair of holes through the upper clamp body, the first set of depressions being non-circular and shaped corresponding to a shape of the clamp bolt nuts;
    a second set of depressions respectively machined adjacent the corresponding holes through the lower clamp body, the second set of depressions being shaped to receive respective heads of the clamp bolts;

a slot depression disposed adjacent each of the second set of depressions in the lower clamp body; and a clamp bolt keeper that is received in each of the slot depressions and is respectively engageable with the heads of the clamp bolts to retain a preload on the clamp bolts, wherein the clamp bolt keeper comprises a hairpin-shaped member including two cantilever beams joined at one end and interfacing teeth disposed at a free end of one of the two cantilever beams, the interfacing teeth engaging the clamp bolt head to retain the preload on the clamp bolt.

8. A clamping device according to claim 7, wherein the clamp bolt head comprises ratchet teeth around a perimeter thereof, the ratchet teeth engaging the interfacing teeth on the clamp bolt keeper when the clamp bolt keeper is received in the slot depression.

* * * * *